(12) United States Patent
Kondo et al.

(10) Patent No.: US 7,369,142 B2
(45) Date of Patent: May 6, 2008

(54) IMAGE-DISPLAYING APPARATUS AND METHOD FOR OBTAINING PIXEL DATA THEREFOR

(75) Inventors: Tetsujiro Kondo, Tokyo (JP); Tsugihiko Haga, Kanagawa (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 814 days.

(21) Appl. No.: 10/921,571

(22) Filed: Aug. 19, 2004

(65) Prior Publication Data

US 2005/0078053 A1 Apr. 14, 2005

(30) Foreign Application Priority Data

Aug. 21, 2003 (JP) .............................. 2003-297635

(51) Int. Cl.
- *G09G 5/00* (2006.01)
- *G09G 5/02* (2006.01)
- *G06K 9/00* (2006.01)

(52) U.S. Cl. .......................... 345/633; 345/8; 345/632; 345/607; 382/154

(58) Field of Classification Search .................... 345/8, 345/607, 632, 633; 382/154, 294
See application file for complete search history.

(56) References Cited

U.S. PATENT DOCUMENTS

| | | | |
|---|---|---|---|
| 5,644,324 A * | 7/1997 | Maguire, Jr. .................... | 345/9 |
| 5,812,257 A * | 9/1998 | Teitel et al. ............. | 356/141.4 |
| 6,028,672 A * | 2/2000 | Geng .......................... | 356/602 |
| 6,346,929 B1 * | 2/2002 | Fukushima et al. ............ | 345/8 |
| 7,053,925 B2 * | 5/2006 | Payne et al. .................. | 348/42 |

OTHER PUBLICATIONS

Patent Abstracts of Japan; Publication No. 2004-015255; Publication Date Jan. 15, 2004.
Patent Abstracts of Japan; Publication No. 2004-015106; Publication Date Jan. 15, 2004.
Patent Abstracts of Japan; Publication No. 2004-023203; Publication Date Jan. 22, 2004.
Patent Abstracts of Japan; Publication No. 2004-013222; Publication Date Jan. 15, 2004.
Patent Abstracts of Japan; Publication No. 2004-012644; Publication Date Jan. 15, 2004.
Patent Abstracts of Japan; Publication No. 2004-015256; Publication Date Jan. 15, 2004.
Patent Abstracts of Japan; Publication No. 09-236880; Publication Date Sep. 9, 1997.

* cited by examiner

*Primary Examiner*—Wesner Sajous
*Assistant Examiner*—Hau H Nguyen
(74) *Attorney, Agent, or Firm*—Frommer Lawrence & Haug LLP; William S. Frommer; Thomas F. Presson

(57) ABSTRACT

A receiver measures strength of magnetic field generated by a transmitter and supplies it to a computer. The computer detects a viewpoint of a viewer based on the strength. The computer sets each pixel-displaying element arranged on the display portion of image display as a subject pixel-displaying element in turn. The computer obtains set pixel data from multiple items of pixel data constituting image data of one screen as pixel data corresponding to the subject pixel-displaying element. The image data has been obtained by a camera arranged for a position on an imaged plane corresponding to the split area in the display portion including the subject pixel-displaying element and stored in data storage. The set pixel data corresponds to a beam of light irradiated from the object along a straight line connecting the viewpoint and the subject pixel-displaying element. The computer supplies the set pixel data to a display.

11 Claims, 12 Drawing Sheets

F I G. 4
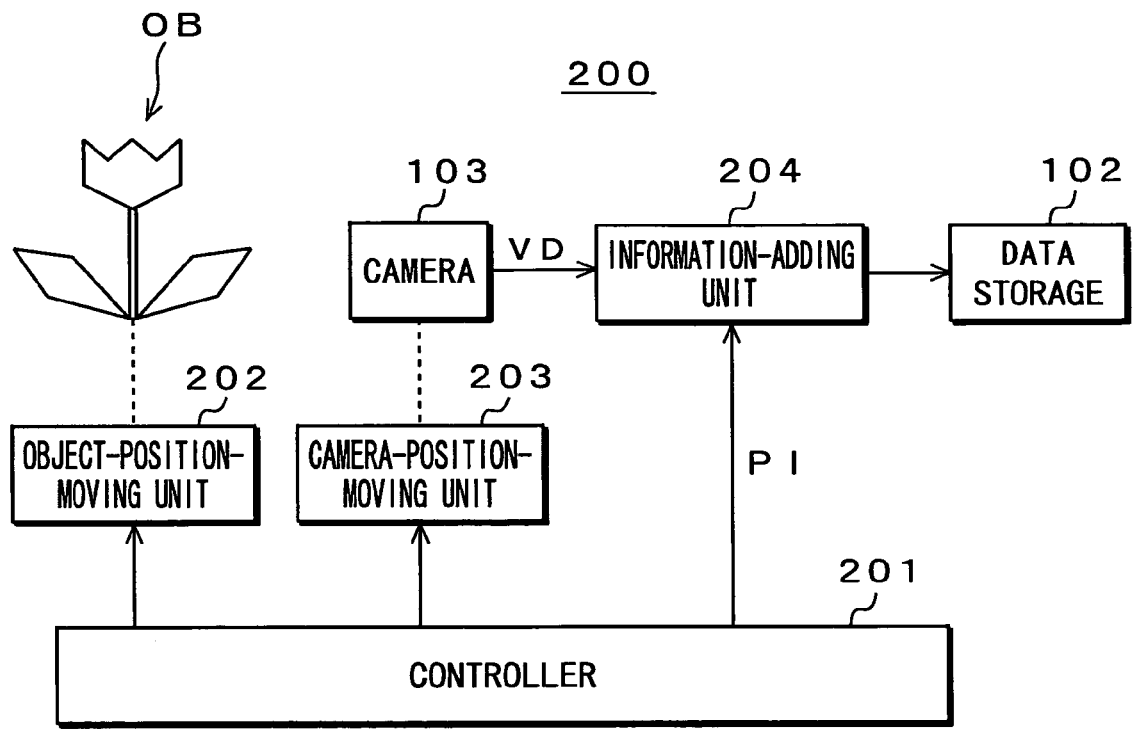
F I G. 5
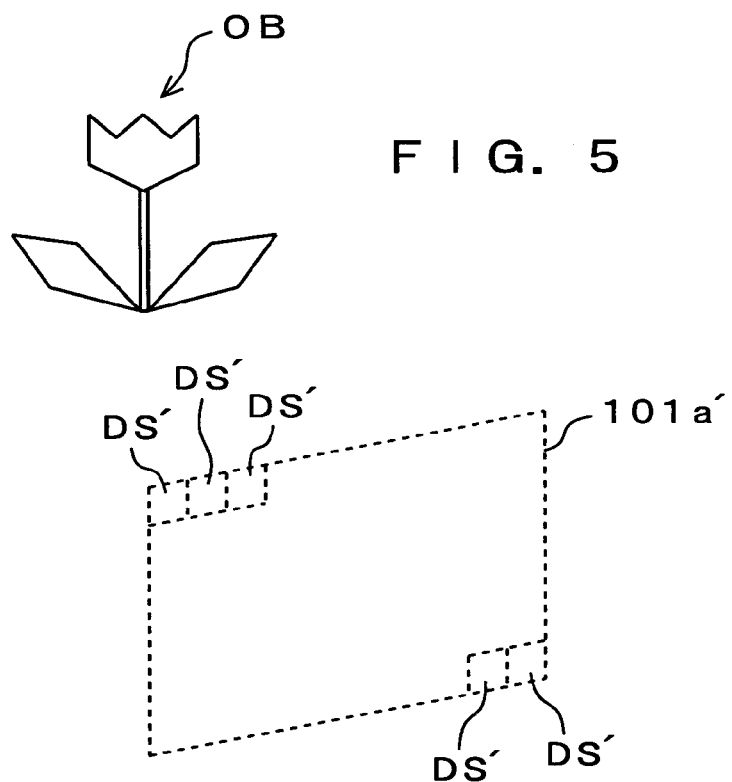

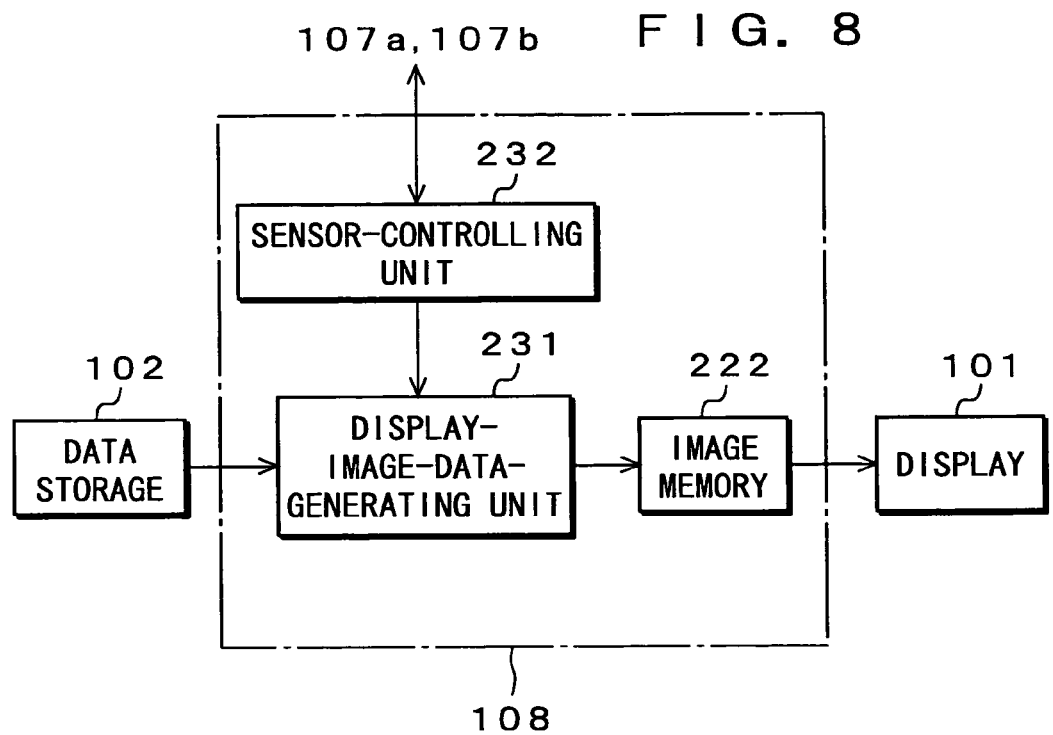
FIG. 8
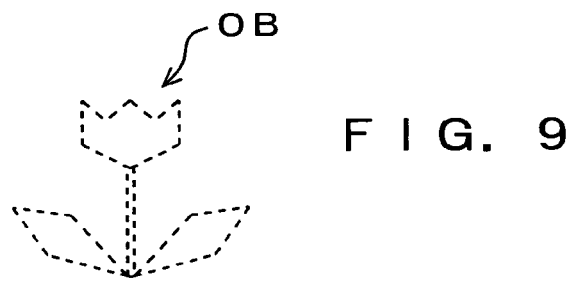
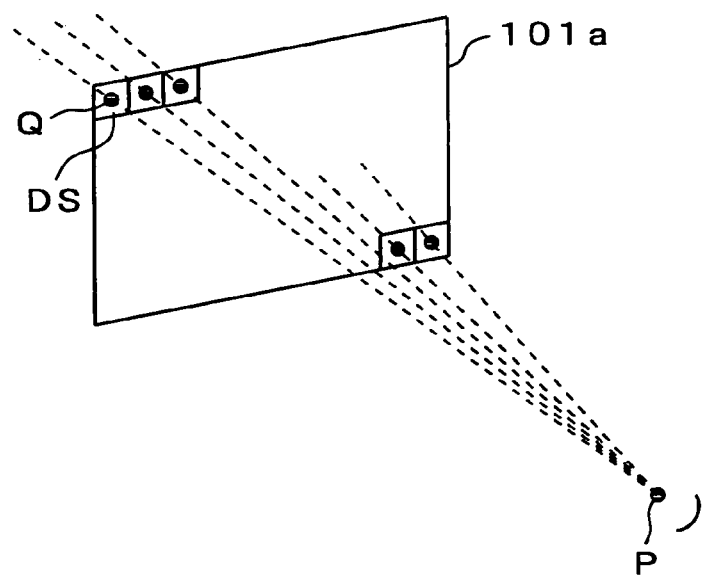
FIG. 9

IMAGE-DISPLAYING APPARATUS AND METHOD FOR OBTAINING PIXEL DATA THEREFOR

BACKGROUND OF THE INVENTION

This application claims the benefits under 35 USC 119 to Japanese priority application 2003-297635, the disclosure of which is incorporated herein by reference.

1. Field of the Invention

The present invention relates to an image-displaying apparatus and a method for obtaining pixel data therefor. More specifically, it relates to an image-displaying apparatus and the like for displaying an actual image thereon.

2. Description of the Prior Art

On a conventional image-displaying apparatus using a cathode ray tube, a liquid crystal display, a projector or the like, an image 10 of object 20 imaged by any video camera 30 is displayed. Such the image 10 is only the one viewed from a position of the camera 30 as a viewpoint thereof, as shown in FIG. 1. If a user (viewer) moves his or her head to alter the viewpoint when he or she sees the image 10 displayed on the display portion 40, the image 10 is remained unchanged as being the image viewed from a center of lens in the camera 30 (hereinafter properly referred to as "camera's viewpoint"). Thus, regarding the conventional displaying apparatus using the cathode ray tube and the like, it has not been successfully performed that the image 10 displayed on the display portion 40 can be altered according to an alteration of the user's viewpoint.

Regarding a technology using a hologram, there has been a chance that the image displayed on the display portion can be altered according to an alteration of the user's viewpoint. For example, it is called as "zebra imaging". Such the zebra imaging, however, requires a large amount of operation and time therefor to create it because it uses the hologram and displays holographic images.

As another technology that the image displayed on the display portion can be altered according to an alteration of the user's viewpoint, a virtual reality (VR) system using immersive projection technology (IPT) or immersive projection display (IPD) has been developed by university of Illinois. For example, it is called as "CAVE" system. Such the VR system, however, is subject to displaying computer graphics (CG) so that it is difficult to be subject to displaying an actual image imaged by video camera.

An image-displaying apparatus such that the actual image can be displayed on the display portion according to an alteration of the user's viewpoint has been developed. For example, Japanese Unexamined Patent Application Publication No. 09-236880 discloses such the apparatus. In such the apparatus, when a viewer's viewpoint is altered to another view area, image contents to be displayed on the display portion such as liquid crystal display are altered with reflecting a difference of the movement based on alteration of the viewer's viewpoint.

In this case, in order to alter the image contents to be displayed on the display portion, image data corresponding to each of the view areas, for example, is previously provided. Thus, limited is the viewer's viewpoint alteration so that it is impossible for the viewer to alter his or her viewpoint to optional one.

Accordingly, an object of the present invention is to provide an image-displaying apparatus and the like wherein an actual image corresponding to the optional viewpoint can be displayed on the display portion having its surface of a predetermined shape in good condition.

SUMMARY OF THE INVENTION

According to an aspect of the present invention, there is provided an image-displaying apparatus. The apparatus comprises image display including a display portion having its surface of a predetermined shape. For example, the surface of the display portion of the image display is plane. Further, the surface of the display portion of the image display may have at least its non-flat part. The display portion is provided with a plurality of pixel-displaying elements.

The apparatus comprises storage device for storing image data of multiple screens obtained by imaging an object by imaging device. The imaging device is arranged with its focus point being positioned at a position on an imaged plane corresponding to each split area obtained by splitting the display portion of the image display to include at least one pixel-displaying element. An axis of lens of the imaging device is orthogonal to the imaged plane. Herein, the focus point is a point on which beams of light from each of the directions of the object side converge as well as a viewpoint of the imaging device.

When obtaining the pixel data, a viewpoint of viewer to the display portion of the image display is determined. Thus, the image-displaying apparatus comprises position-acquiring device for acquiring a viewpoint of viewer to the display portion of the image display or position-setting device for setting a viewpoint of viewer to the display portion of the image display. The apparatus also comprises image-processing device for processing the image data to set each pixel-displaying element arranged on the display portion of the image display as a subject pixel-displaying element in turn. To obtain pixel data (hereinafter properly referred to as "pixel data corresponding to the subject pixel-displaying element") for displaying pixel on this subject pixel-displaying element, the following will be carried out.

As such the pixel data, the image-processing device obtains set pixel data from multiple items of pixel data constituting image data of one screen. The image data has been obtained by the imaging device arranged for a position on an imaged plane corresponding to the split area including the subject pixel-displaying element. The image data may be stored in the storage device. The set pixel data corresponds to a beam of light from the object. The beam of light is irradiated along a straight line connecting the determined viewpoint of the viewer and the subject pixel-displaying element.

According to another aspect of the present invention, there is provided a method for obtaining pixel data of image display including a display portion having its surface of a predetermined shape and being provided with a plurality of pixel-displaying elements. The pixel data allows pixel to be displayed on the plurality of pixel-displaying elements. The method comprises the step of preparing image data of multiple screens obtained by imaging an object by imaging device, wherein the imaging device is arranged with its focus point being positioned at a position on an imaged plane corresponding to each split area obtained by splitting the display portion of the image display to include at least one pixel-displaying element, and an axis of its lens being orthogonal to the imaged plane, and determining a viewpoint of viewer to the display portion of the image display. The method also comprises the step of setting each pixel-displaying element arranged on the display portion of the image display as a subject pixel-displaying element in turn, and obtaining set pixel data from multiple items of pixel data constituting image data of one screen, which are obtained by the imaging device arranged for a position on an imaged plane corresponding to the split area including the subject pixel-displaying element, as pixel data for displaying pixel on the subject pixel-displaying element. The set pixel data corresponds to a beam of light irradiated from the object along a straight line connecting the determined viewpoint and the subject pixel-displaying element.

According to further aspect of the present invention, there is provided a computer program for allowing a computer to carry out the above method for obtaining pixel data.

According to the present invention, as pixel data for displaying pixel on each pixel-displaying element of display portion, set pixel data corresponding to a beam of light irradiated from the object along a straight line connecting the viewpoint of the viewer and the subject pixel-displaying element is obtained from multiple items of pixel data constituting image data of one screen, which has been obtained by imaging the object by the imaging device arranged for a position on an imaged plane corresponding to the split area including the subject pixel-displaying element. Thus, an actual image corresponding to an alteration of the viewpoint of a viewer is well displayable on the display portion having its surface of a predetermined shape.

In this case, in a case of acquiring the viewpoint of a viewer, an actual image corresponding to an optional viewpoint of a viewer is displayable thereon. Alternatively, in a case of setting the viewpoint of a viewer, when he or she shifts his or her set viewpoint, an image as if it is shifted is displayable thereon, if he or she does not shift it actually.

The image display may have multiple display portions. Thus, each of the viewpoints of the viewers to each of the multiple display portions is determined so that the pixel data relative to each of the pixel displaying elements of the multiple display portions may be obtained. In this case, parallel actual images corresponding to the determined viewpoints of the viewers are displayable on the multiple display portions.

Further, the display portion includes a first display sub-portion for displaying an image to be viewed from left eye of the viewer and a second display sub-portion for displaying the image to be viewed from right eye of the viewer. In this case, viewpoints of the right and left-eyes of the viewer to these first and second display sub-portions are obtained so that the pixel data relative to each of the pixel-displaying elements of the first and second display sub-portions may be obtained. Thus, the viewer may view an image displayed on the first display sub-portion from his or her left eye and an image displayed on the second display sub-portion from his or her right eye to see a three-dimensional image corresponding to the viewpoints.

As described above, as pixel data for displaying pixel on each pixel-displaying element, set pixel data corresponding to a beam of light irradiated from the object along a straight line connecting the viewpoint of the viewer and the subject pixel-displaying element is obtained from multiple items of pixel data constituting image data of one screen, which has been obtained by imaging the object by the imaging device arranged for a position on an imaged plane corresponding to the split area including the subject pixel-displaying element. At this point, pixel position on imaged plane corresponding to this set pixel data is specified.

Additionally, when the surface of the display portion of the image display has at least its non-flat part, the storage device stores unit vector of the imaging device along the axis direction of its lens and unit vectors of the imaging device along vertical and horizontal directions thereof, which are orthogonal to the axis direction of the lens, with the vectors respectively corresponding to the image data of multiple screens. Using these unit vectors, pixel position in an imaging part of the imaging device by which the set pixel data is obtained as described above is specified. Thus, using the stored unit vectors allows pixel position to be easily and quickly specified. This enables the pixel data corresponding to the viewpoint of each of the pixel-displaying elements of the display portion to be shortly obtained. According to this, an image corresponding to alteration of the viewpoint is smoothly displayable on the display portion.

The image display may include a semi-spherical screen having the display portion, a projector for projecting the image to the display portion of the semi-spherical screen via fish-eye lens, and an image generator for generating the image to be projected by the projector. In this case, the image generator generates the image to be projected by the projector, based on the pixel data corresponding to each of the pixel-displaying elements arranged on the display portion.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 3A to 3C are diagrams each for showing a positional relationship among object, camera, display portion, viewpoint, and the like;

FIG. 4 is a block diagram for showing a configuration of image-data-generating device;

FIG. 5 is a diagram for illustrating an alteration of imaged positions;

FIG. 8 is a block diagram for showing a configuration of operation for the computer as image-processing apparatus;

FIG. 9 is a diagram for illustrating a process for obtaining image data corresponding to each pixel-displaying element of the display portion;

DESCRIPTION OF THE PREFERRED EMBODIMENTS

Figure 1:
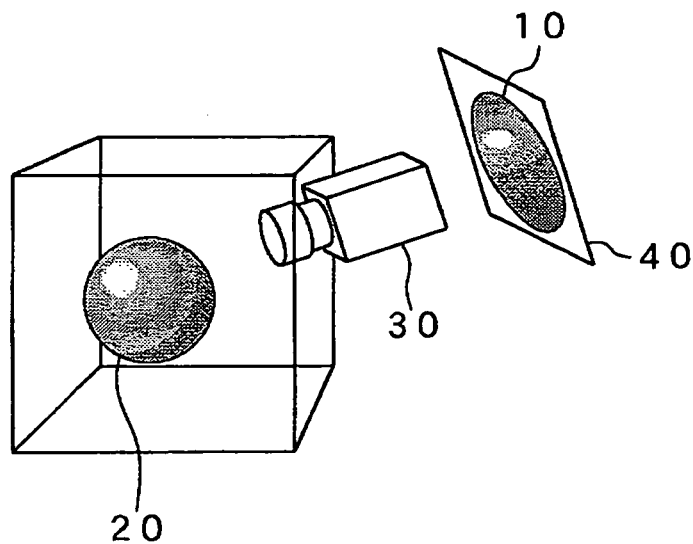
FIG. 1 is a diagram for describing how to display an image in a conventional way.
Figure 2:
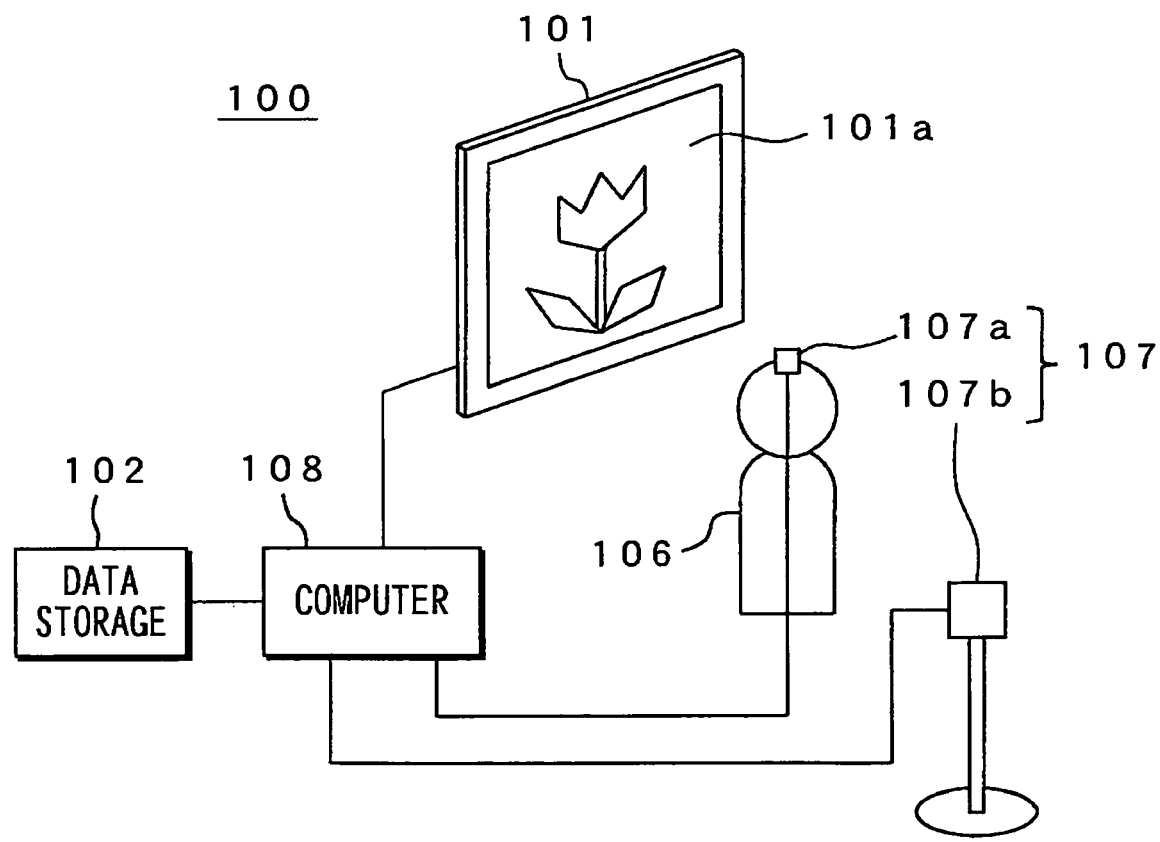
FIG. 2 is a block diagram for showing a configuration of an embodiment of the image-displaying apparatus according to the invention.

Hereinafter, a preferred embodiment of the present invention will be described with reference to the accompanying drawings. FIG. 2 shows a configuration of an embodiment of an image-displaying apparatus 100 according to the invention.

The image-displaying apparatus 100 comprises a display 101 as an image display. This display 101 includes a cathode-ray tube (CRT), a liquid crystal display (LCD), and a plasma display panel (PDP). The display 101 also includes a projector for projecting an image on a screen via lens.

The display 101 includes a display portion 101a having its plane surface. The display portion 101a displays an image. The display portion 101a is provided with a plurality of pixel-displaying elements. Displaying pixel on each of the pixel-displaying elements based on pixel data respectively corresponding thereto allows the image to be displayed on the entire display portion 101a.

Figure 3A:
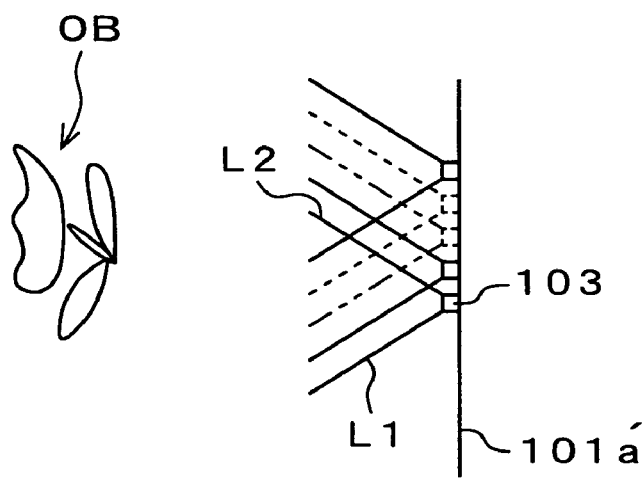

The display 101 includes data storage 102 as storage device for storing image data. The data storage 102 previously stores the image data of multiple screens. In this case, as shown in FIG. 3A, an object OB is imaged by a camera 103 as imaging device, which is arranged with its focus point being positioned at a position on an imaged plane 101a' corresponding to each split area obtained by splitting the display portion 101a of the display 101 to include one or more pixel-displaying element, and an axis of its lens being orthogonal to the imaged plane. This allows the image data of multiple screens to be obtained. The focus point of the camera 103 is a point on which beams of light from any directions in the object OB side converge as well as a viewpoint of the camera 103. In FIG. 3A, straight lines L1 and L2 show a range wherein the camera 103 can image an object.

FIG. 4 shows a configuration of image-data-generating device 200 for generating image data of multiple screens that is previously stored in the data storage 102. The image-data-generating device 200 includes a controller 201 for controlling operations of the entire device, and the camera 103 for imaging the object OB.

The image-data-generating device 200 also includes object-position-moving unit 202 for moving a position of the object OB and camera-position-moving unit 203 for moving a position of the camera 103. The object-position-moving unit 202 is provided with a table, not shown, for mounting the object OB. Moving the table allows a position of the object OB to be moved.

The display portion 101a (see FIG. 2) of the display 101 is split to multiple split areas DS. Each split area DS includes one or more pixel-displaying element, as described above. The controller 201 controls the object-position-moving unit 202 and the camera-position-moving unit 203 so that the camera 103 is arranged in turn on positions DS' on the imaged plane 101a' corresponding to each split area DS obtained by splitting the display portion 101a, as shown in FIG. 5. In this case, the camera 103 is always arranged with its focus point being positioned at each position DS' and an axis of its lens being orthogonal to the imaged plane 101a'.

The image-data-generating device 200 also includes information-adding unit 204. The information-adding unit 204 adds imaged position information PI for indicating which of positions DS' the camera 103 is arranged to image the object OB to the image data VD of one screen, which is obtained by the camera 103 imaging the object OB with being arranged for each of the positions DS' on the imaged plane 101a'.

The following will be described on the operations of the image-data-generating device 200.

The controller 201 controls the object-position-moving unit 202 and the camera-position-moving unit 203 so that the camera 103 is arranged in turn on each of the positions DS' on the imaged plane 101a' corresponding to each split area DS obtained by splitting the display portion 101a (see FIG. 5).

The camera 103 images the object OB with it being arranged for each of the positions DS' on the imaged plane 101a'. In this case, the camera 103 is arranged with its focus point being positioned at the position DS' and thus, thereby obtaining pixel data by beams of light received from different directions of the object OB side in each pixel position in the imaging part of the camera 103. The image data VD of one screen, which is output from the camera 103, is supplied to the information-adding unit 204.

The imaged position information PI for indicating which of split positions DS' the camera 103 is arranged to image the object OB is supplied from the controller 201 to the information-adding unit 204 with it corresponding to the image data VD of one screen, which is supplied from the camera 103 to the information-adding unit 204. In the information-adding unit 204, the imaged position information PI is added to the image data VD of one screen. The information-adding unit 204 supplies the data storage 102 with the image data VD of one screen to which the imaged position information PI is added, and then, they are stored in the data storage 102.

Figure 6:
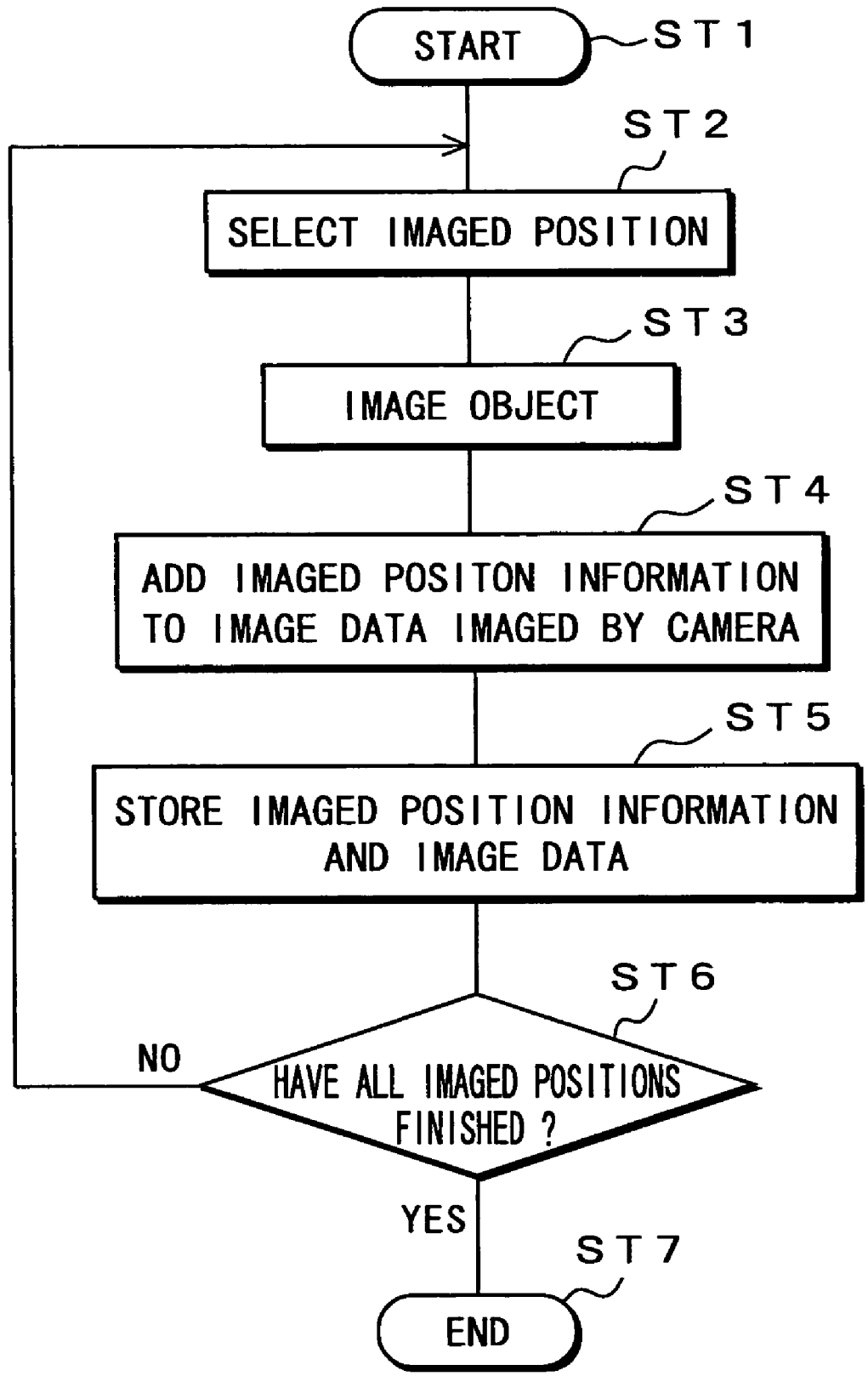
FIG. 6 is a flowchart for showing a procedure for image-data-generating process.

FIG. 6 is a flowchart for showing a procedure for image-data-generating process in the image-data-generating device 200.

In step ST1, the process starts and in step ST2, an imaged position is selected. This is, moving the object OB and the camera 103 enables the camera 103 to be arranged on any of the multiple positions DS' on the imaged plane 101a'. In step ST3, the camera 103 images the object OB.

In step ST4, the imaged position information PI is added to the image data VD of one screen, which has been obtained by the camera 103 imaging the object OB. In step ST5, the image data VD of one screen to which the imaged position information PI is added is stored in the data storage 102.

In step ST6, it is determined whether the processing in all the imaged positions is finished. If it does not finish the processing in all the imaged positions, the process goes back to step ST2 wherein next imaged position is selected and then, a process is performed, similar to the above, such that the image data VD of one screen, which is obtained by the camera 103 imaging the object OB in this imaged position, is stored in the data storage 102. On the other hands, if finishing the processing in all the imaged positions, the process finishes.

Although it has described that both of the object OB and the camera 103 are moved in the image-data-generating device 200, any one of them may be moved. In this case, the object-position-moving unit 202 or the camera-position-moving unit 203 in unnecessary.

Referring back to FIG. 2, the image-displaying apparatus 100 comprises a positional sensor 107 as position-acquiring device for acquiring a viewpoint of a user (a viewer) 106.

The positional sensor 107 includes a receiver 107a and a transmitter 107b. The receiver 107a measures strength of magnetic field generated by the transmitter 107b. The receiver 107a is attached to a head of the user 106, for example, but may be attached to a tie clasp, glasses or the like.

A computer 108, which will be described later, controls the receiver 107a and the transmitter 107b as the positional sensor 107. Namely, the transmitter 107b generates magnetic field under the control of the computer 108. The receiver 107a measures strength of the magnetic field generated by the transmitter 107b and supplies it to the computer 108. The computer 108 detects a position of the user 106, i.e., a viewpoint of the user 106, based on the strength of this magnetic field.

As magnetic field sensor as the positional sensor 107, third dimensional positional sensor manufactured by Polhemus Co., Ltd., 40 Hercules Drive, Colchester, Vt. 05446, USA, may be used. It is possible to suppose that a motion of the user 106 is captured and processed to obtain a viewpoint of the user 106. Such the method may be used in a motion capture system using a camera. For example, the motion capture system is disclosed in Web site of Ohyou Keisoku Kenkyusho Inc. 3-26-12 Kita-senzoku, Ohta-ku, Tokyo.

The image-displaying apparatus 100 comprises the computer 108 as image-processing device. The computer 108 includes a workstation. The computer 108 generates pixel data for displaying pixel on each of the pixel-displaying elements arranged on the display portion 101a of the display 101, i.e., pixel data corresponding to each of the pixel-displaying elements, which corresponds to the viewpoint of the user 106, using image data of multiple screens stored in the data storage 102. The computer 108 then supplies the display 101 with this pixel data.

Figure 3B:
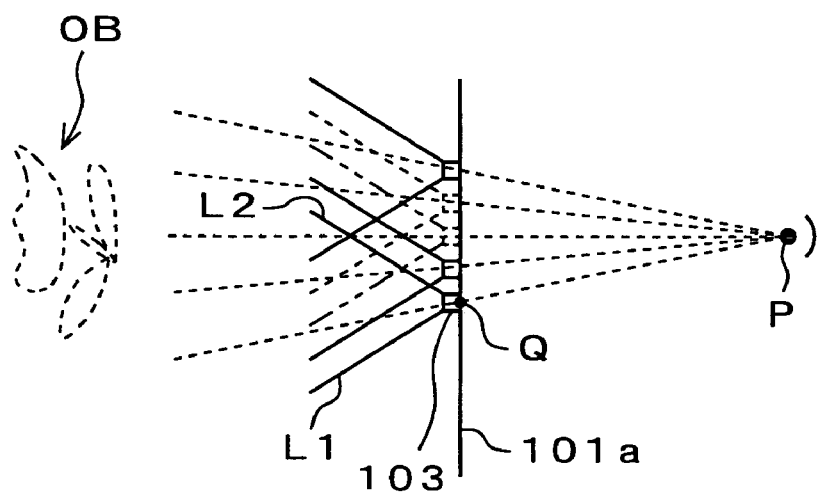

The computer 108 sets each of the pixel-displaying elements arranged on the display portion 101a as a subject pixel-displaying element Q in turn. As pixel data corresponding to the subject pixel-displaying element Q, the computer 108 obtains set pixel data from multiple items of pixel data constituting image data of one screen, which is obtained by imaging the object by the camera 103 arranged for a position DS' on the imaged plane 101a' corresponding to each split area DS including the subject pixel-displaying element Q, as shown in FIG. 3B. The set pixel data corresponds to a beam of light irradiated from the object OB along a straight line connecting the viewpoint P and the subject pixel-displaying element Q.

Figure 7:
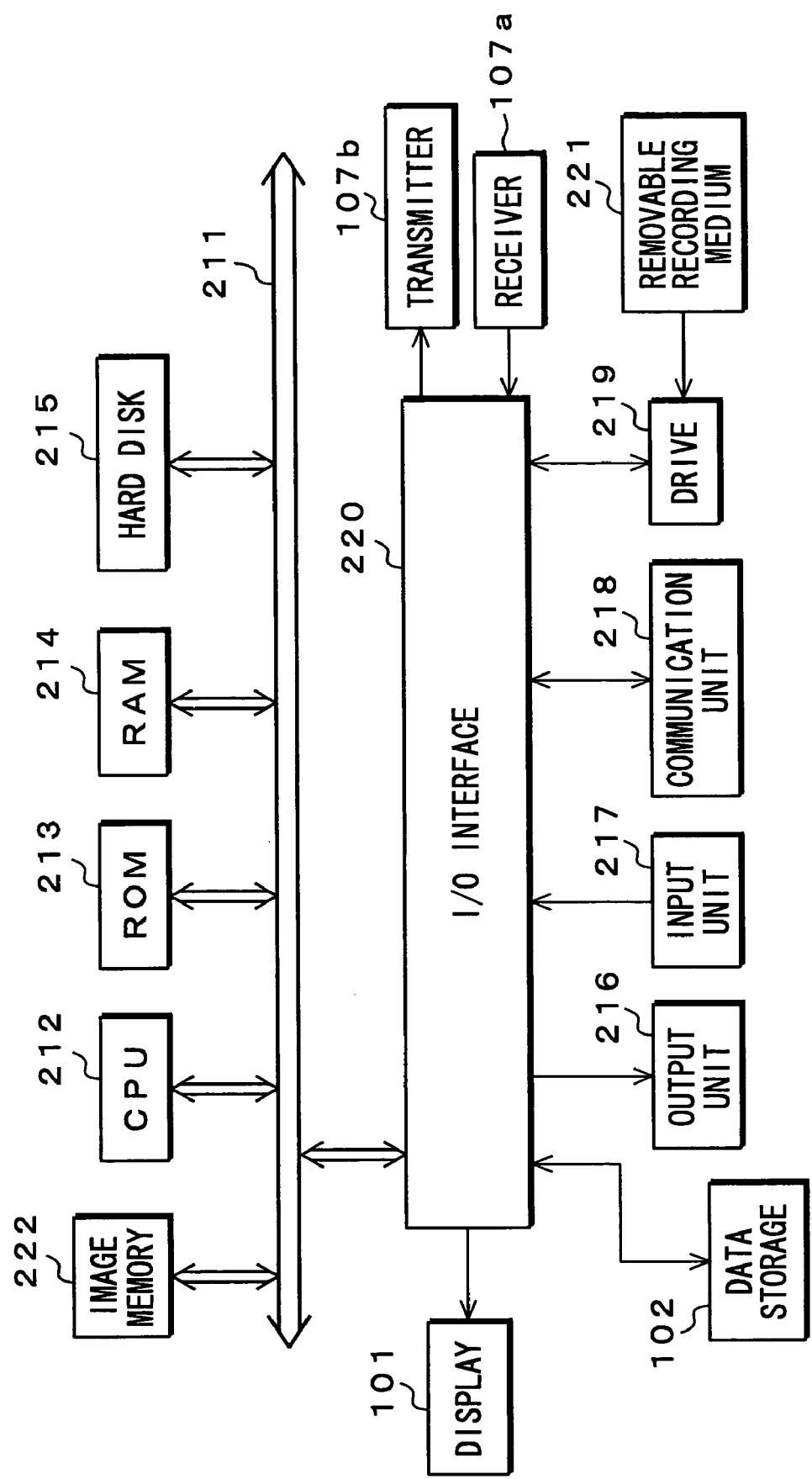
FIG. 7 is a block diagram for showing a hardware configuration of a computer.

FIG. 7 shows a configuration of hardware in the computer 108. A program for carrying out a series of processing, which will be described later, is installed in the computer 108. The program may be previously stored in a hard disk 215 or a read-only memory (ROM) 213 as storage medium built in the computer 108.

Alternatively, the program may be temporarily or perpetually stored in removable recording medium 221 such as a flexible disk, a compact disk read only memory (CD-ROM), a magneto optical (MO) disk, a digital versatile disk (DVD), a magnetic disk, and a semiconductor memory. Such the removable recording medium 221 may be provided as so-called package software.

Further, the program may be downloaded from any downloading sites to the computer 108 by wireless via artificial satellite for digital satellite broadcasting. The program may be also transferred to the computer 108 by cable via a network such as a local area network (LAN) and the Internet. The computer 108 receives the program thus downloaded or transferred through its communication unit 208 and installs it on its built-in hard disk 215.

The computer 108 includes a central processing unit (CPU) 212. The CPU 212 connects an input/output (I/O) interface 220 via a bus 211. When the CPU 212 receives instructions via the I/O interface 220 under the operation of input unit 217, which is composed of a keyboard, a mouse, a microphone, and the like, by a user, it performs the programs stored in read only memory (ROM) 213 according to the user's operation. Alternatively, the CPU 212 loads the programs stored in the hard disk 215, the ones downloaded or transferred from the satellite or the network and received through the communication unit 218 to be installed in the hard disk 215, or the ones read out of removable recording medium 221 mounted in a drive 219 to be installed in the hard disk 215 to random access memory (RAM) 214 so that they may be performed. The CPU 212 performs a process based on a flowchart, which will be described later, or a process according to a configuration of block diagram, which will be also described later. The CPU 212 outputs the processed result thereof through output unit 216 composed of a speaker and the like, transmits it through the communication unit 218, or records it on the hard disk 215, via the I/O interface 220.

The I/O interface 220 is connected with the data storage 102, the display 101, the receiver 107a, and the transmitter 107b. An image memory 222 is connected to the bus 211. The CPU 212 controls the transmitter 107b and receives the output from the receiver 107a, via the I/O interface 220, to detect a viewpoint of the user 106.

The CPU 212 obtains pixel data for displaying pixel on each pixel-displaying element arranged on the display portion 101a of the above display 101, which corresponds to the viewpoint of the user 106, using image data of multiple screens stored in the data storage 102. It then stores the pixel data thus obtained in the image memory 222. The CPU 212 also reads the stored pixel data out of the image memory 222 to supply it to the display 101 via the I/O interface 220, thereby allowing an image corresponding to the viewpoint of the user 106 to be displayed on the display portion 101a of the display 101.

Process steps for describing the programs to allow the computer 108 to perform various species of processes is not always limited to a process on time-series like one processed along the orders of the flowchart, which will be described later. Parallel or individual process steps may be allowed (for example, parallel process or process for object). Only one computer 108 may process the program or plural computers may perform a decentralized process on the program. The program may be transferred to any remote computers to be performed.

FIG. 8 shows a configuration of operation for an image-processing apparatus that the computer 108 (CPU 212) implements by performing the programs. Such the image-processing apparatus comprises a display-image-data-generating unit 231 and a sensor-controlling unit 232.

The sensor-controlling unit 232 controls the positional sensor 107 including the receiver 107a and the transmitter 107b to detect the viewpoint P of the user 106 and supplies its detection output to the display-image-data-generating unit 231. Namely, the sensor-controlling unit 232 controls the transmitter 107b to generate magnetic field. The sensor-controlling unit 232 also detects a viewpoint of the user 106 based on a detection result of the magnetic field generated by the transmitter 107b, which is supplied from the receiver 107a.

The display-image-data-generating unit 231 generates pixel data corresponding to each pixel-displaying element arranged on the display portion 101a of the above display 101, which corresponds to the viewpoint P of the user 106, using image data of multiple screens stored on the data storage 102. The display-image-data-generating unit 231 stores the pixel data thus generated in the image memory 222. In this case, the display-image-data-generating unit 231 sets each of the plural pixel-displaying elements arranged on the display portion 101a as a subject pixel-displaying element Q in turn and obtains the pixel data corresponding to each of the subject pixel-displaying elements Q.

This is, the display-image-data-generating unit 231 obtains set pixel data from multiple items of pixel data constituting image data of one screen, which are obtained by imaging the object by the camera 103 arranged for a position DS' on an imaged plane 101a' corresponding to each split area DS including the subject pixel-displaying element Q. The set pixel data corresponds to each of the beams of light irradiated from the object OB along straight lines connecting the viewpoint P and the subject pixel-displaying elements Q.

Figure 3C:
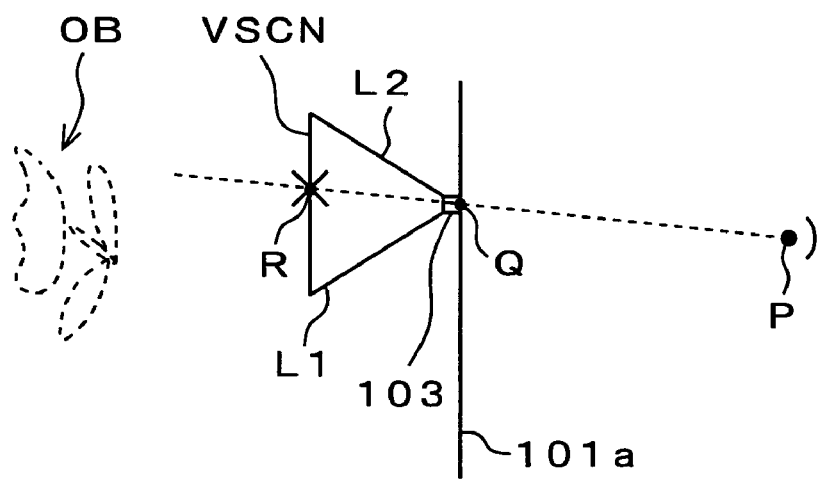

The display-image-data-generating unit 231 specifies each pixel position in an imaging part of the camera 103 for obtaining the set pixel data. Therefor, as shown in FIG. 3C, virtual screen VSCN that is orthogonal to an axis of lens of the camera 103 is set between the display portion 101a and the object OB. It is conceivable in this case that an image imaged by the imaging part of the camera 103 is mapped on the virtual screen VSCN.

Figure 10:
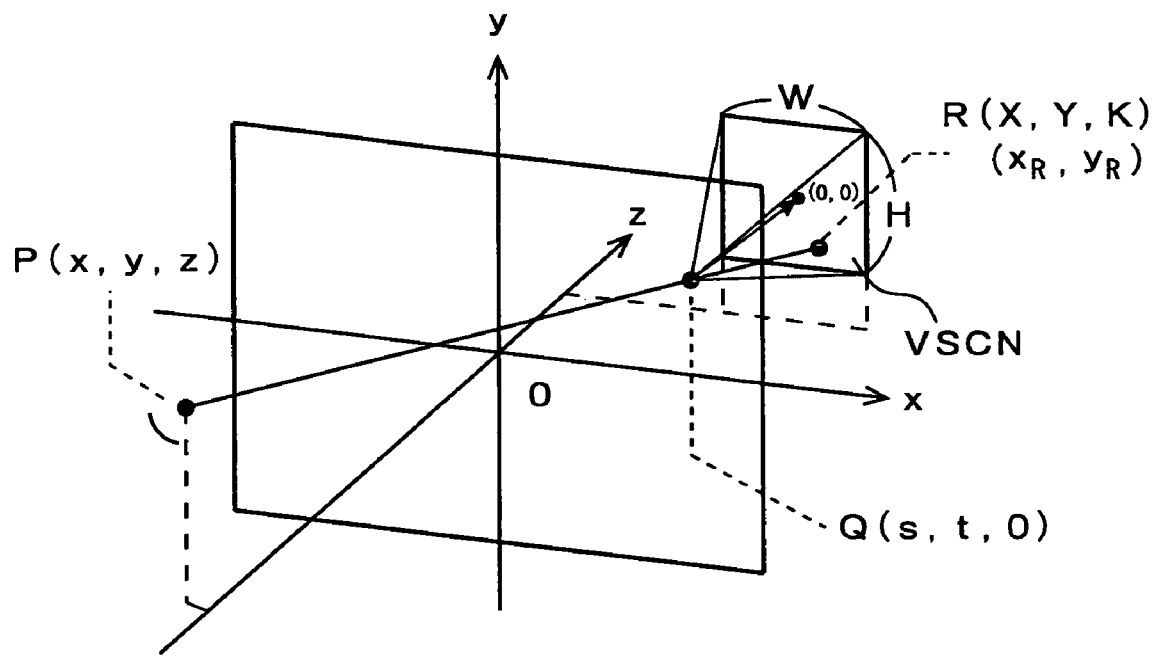
FIG. 10 is a diagram for illustrating how to obtain a coordinate of a reference point in (a plane display)

As shown in FIGS. 3C and 10, an intersection between the straight line connecting the viewpoint P and the subject pixel-displaying element Q and the virtual screen VSCN is estimated as a reference point R. A second dimensional coordinate (xR, yR) of the reference point R is given. In this case, a second dimensional coordinate of the intersection between the axis of lens of the camera 103 and the virtual screen VSCN is estimated as (0, 0). Its X-coordinate xR and Y-coordinate yR are respectively divided by a width W and a height H of the virtual screen VSCN. Thereafter, the divided coordinates multiplied by numbers of horizontal pixels WRL and numbers of vertical pixels HRL of the imaging part of the camera 103 equal the pixel position (xR', yR') of imaging part of the camera 103 for obtaining the set pixel data.

The following will be described more in detailed on how to get the pixel position (xR', yR') with reference to FIG. 10.

When a third dimensional coordinate of a center of the display portion 101a of the display 101 is set to (0, 0, 0), a third dimensional coordinate of the viewpoint P is (x, y, z) and a third dimensional coordinate of the subject pixel-displaying element Q is (s, t, 0) as well as a third dimensional coordinate of the reference point R is (X, Y, K). Herein, K is a constant, which indicates a distance between a focus point of the camera 103 and the virtual screen VSCN.

Thus, vectors PQ and QR indicate as follows:

PQ=(s−x,t−y,−z)QR=(X−s,Y−t,K)

Since the vectors PQ and QR are parallel to each other, X-coordinate xR and Y-coordinate yR of the reference point R are given according to the following formulae (1) and (2):

$$x_R = X - s = \frac{s-x}{-z} K \qquad (1)$$

-continued $$y_R = Y - t = \frac{t-y}{-z} K \qquad (2)$$

The X-coordinate xR and Y-coordinate yR are respectively divided by a width W and a height H of the virtual screen VSCN. Thereafter, the divided coordinates multiplied by numbers of horizontal pixels WRL and numbers of vertical pixels HRL of the imaging part of the camera 103 equal the pixel position (xR', yR') according to the following formula (3):

$$(x'_R, y'_R) = \left(\frac{s-x}{-z} \cdot \frac{W_{RL}}{W} \cdot K, \frac{t-y}{-z} \cdot \frac{H_{RL}}{H} \cdot K\right) \qquad (3)$$

The display-image-data-generating unit 231 may select and obtain the above set pixel data from multiple items of pixel data constituting image data of one screen based on the given pixel position (xR', yR').

Figure 11:
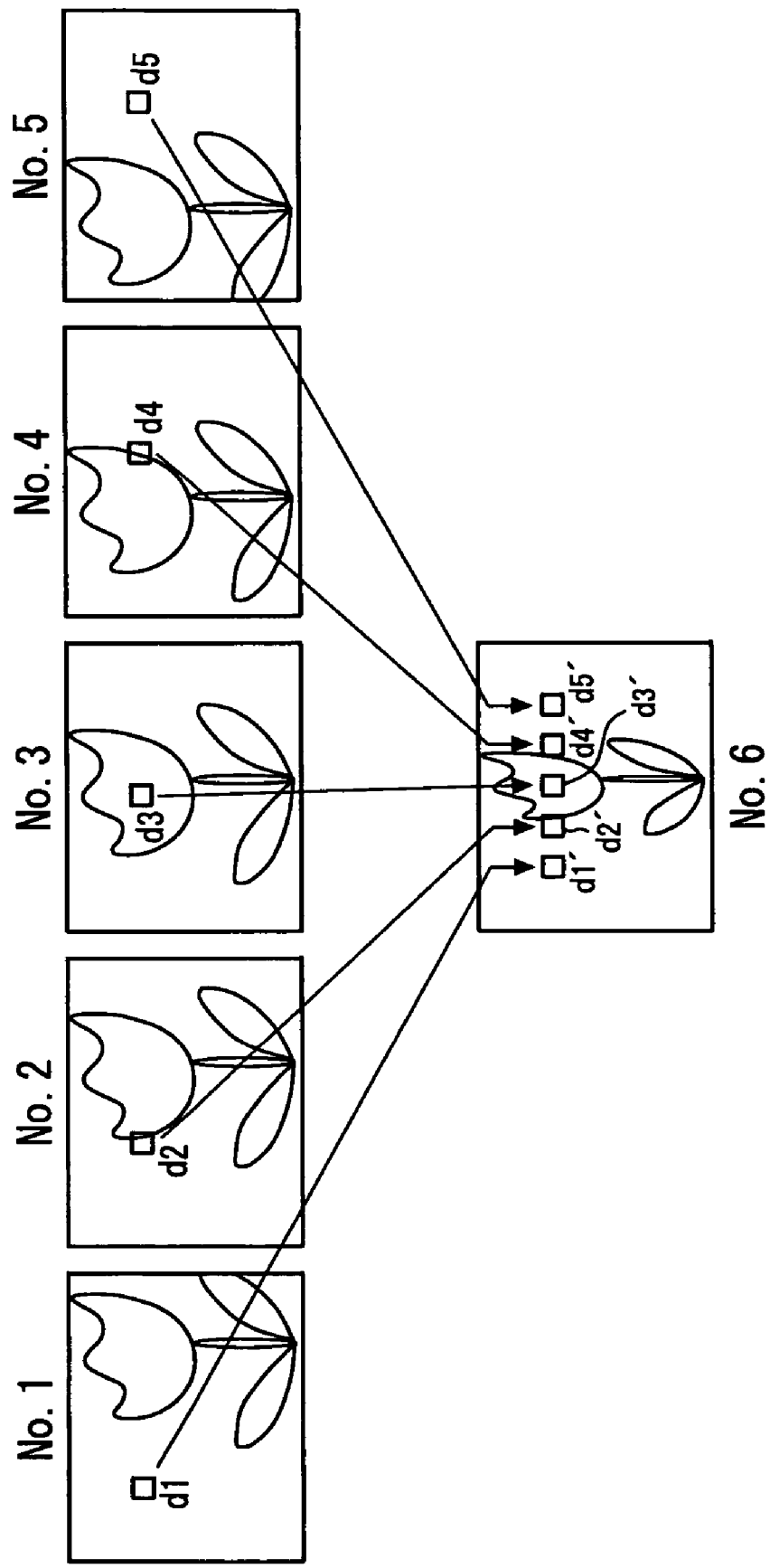
FIG. 11 is a diagram for illustrating reconstruction of image data corresponding to the viewpoint.

As described above, the display-image-data-generating unit 231 obtains the pixel data for displaying pixel on each pixel-displaying element arranged on the display portion 101a of the display 101 and stores it in the image memory 222 so that image data of one screen corresponding to the viewpoint of the user 106 can be reconstituted from the image data of multiple screens stored in the data storage 102. FIG. 11 shows an example of a correspondence of the pixel data between items of image data No. 1 to No. 5 imaged by the camera 103 and the reconstituted image data No. 6. The items of the pixel data d1 to d5 in the items of image data No. 1 to No. 5 are used as items of the pixel data d1' to d5' in the image data No.6.

Figure 12:
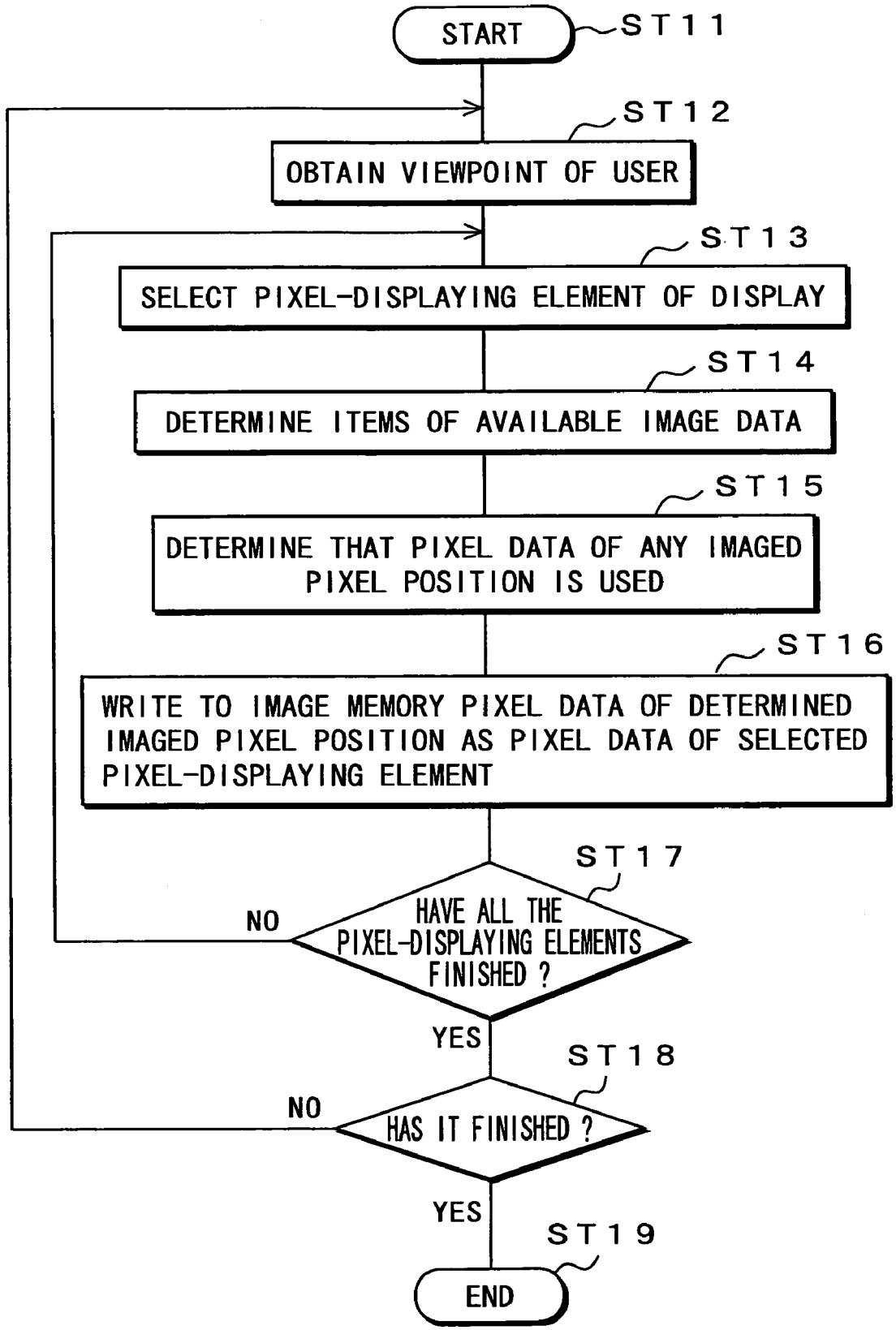
FIG. 12 is a flowchart for showing a procedure of image processing when obtaining pixel data corresponding to each pixel-displaying element of the display portion.

With reference to a flowchart of FIG. 12, image-processing process in an image-processing device (the computer 108) shown in FIG. 8 will be described.

In step ST11, the process starts and in step ST12, the receiver 107a and the transmitter 107b as the positional sensor 107 are controlled so that a viewpoint P of the user 106 can be obtained.

In the step ST13, as the subject pixel-displaying element Q, any pixel-displaying element is selected from multiple pixel-displaying elements constituting the display portion 101a of the display 101. In the step ST14, from image data VD of multiple screens stored in the data storage 102, image data of one screen obtained by imaging the object by the camera 103 arranged on the position DS' on the imaged plane corresponding to the split area DS including the subject pixel-displaying element Q selected in the step ST12 is determined as imaged image data VD to be available. In this case, based on imaged position information PI that is added to each image data VD of one screen, the available imaged image data VD is identified.

In the step ST15, as the pixel data of the subject pixel-displaying element Q selected in the step ST13, it is determined to use pixel data of any imaged pixel position from multiple items of pixel data constituting image data of one screen selected in step ST14. In this step ST15, using information of the viewpoint P of the user 106 obtained in step ST12 or the like, the pixel position (xR', yR') as shown in the above formula (3) is given.

In step ST16, the pixel data of the imaged pixel position determined in the step ST15 is selected as the pixel data corresponding to the subject pixel-displaying element Q selected in the step ST13 from multiple items of the pixel data constituting image data of one screen selected in the step ST14. The selected data is written into an address in the image memory 222 corresponding to the subject pixel-displaying element Q.

In step ST17, it is determined whether the process for obtaining the pixel data corresponding to all the pixel-displaying elements constituting the display portion 101a of the display 101 is finished. If it does not finish the processing in all pixel-displaying elements, the process goes back to step ST13 wherein next subject pixel-displaying element Q is selected and then, a process for obtaining the pixel data corresponding to this subject pixel-displaying element Q is performed, similar to the above. On the other hands, if finishing the process for all the pixel-displaying elements, the process goes to step ST18.

In step ST18, it is determined whether the input unit 217 is operated (see FIG. 7) by the user to finish the image processing. If the input unit 217 is not operated to finish the image processing, the process goes back to step ST12 wherein the processing similar to the above is repeated. On the other hands, If the input unit 217 is operated to finish the image processing, the process goes to step ST19 wherein the process finishes.

The following will be described on operations of the image-displaying apparatus 100 shown in FIG. 2.

The transmitter 107b generates magnetic field under the control of the computer 108. The receiver 107a measures strength of the magnetic field generated by the transmitter 107b and supplies it to the computer 108. The computer 108 detects a viewpoint of the user 106 based on the strength of magnetic field. The computer 108 creates pixel data for displaying pixel on each pixel-displaying element arranged on the display portion 101a of the display 101, which corresponds to the viewpoint of the user 106, using image data of multiple screens stored in the data storage 102. The computer 108 supplies the pixel data thus created to the display 101. Thereby, an actual image corresponding to the viewpoint of the user 106 may be displayed on the display portion 10a of the display 101.

Thus, according to the image-displaying apparatus 100 as shown in FIG. 2, as the pixel data corresponding to each pixel-displaying element of the display portion 101a of the display 101, set pixel data is obtained from multiple items of pixel data constituting image data of one screen, which is obtained by imaging the object by the camera 103 arranged for the position DS' on an imaged plane 101a' corresponding to each split area DS including the pixel-displaying element. The set pixel data corresponds to a beam of light irradiated from the object OB along a straight line connecting the viewpoint of the user 106 and this pixel-displaying element (the subject pixel-displaying element Q). Thereby, an actual image corresponding to any optional viewpoint of the user 106 may be well displayed on the display portion 101a of the display 101.

Figure 13A:
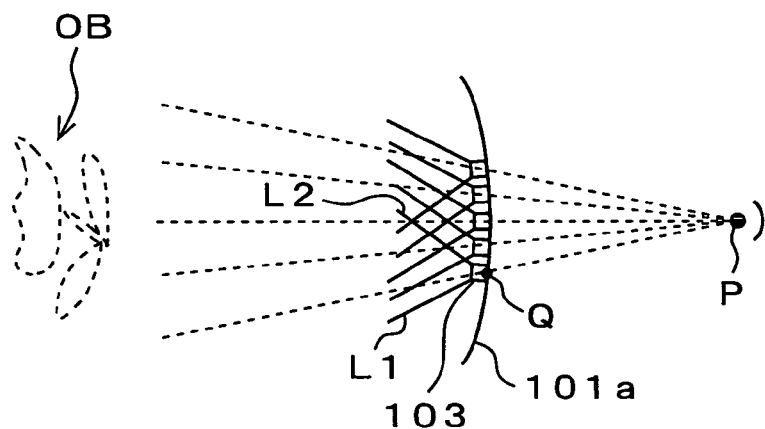
FIGS. 13A to 13C are diagrams each for showing another embodiments wherein the display portion of the image display has its surface of different shapes.
Figure 13B:
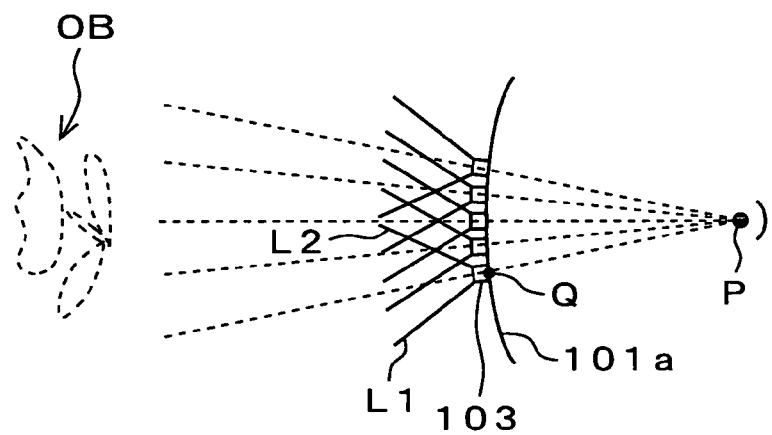

Although in the above image-displaying apparatus 100, the display 101 with the display portion 101a having its plane surface has been described, but the invention is not limited thereto. According to the invention, the surface of the display portion 101a may have various shapes. For example, as shown in FIG. 13A, the surface of the display portion 101a may be convex such as a spherical one. As shown in FIG. 13B, the surface of the display portion 101a may be concave such as a reverse-spherical one. Alternatively, the surface of the display portion 101a may have a shape including both of convex and concave ones, which is not shown.

Figure 13C:
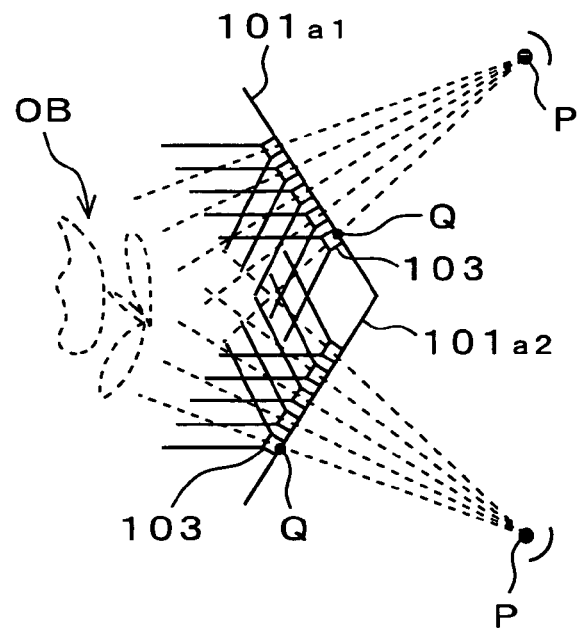

Further, the display 101 may have multiple display portions, for example, two display portions 101a1, 101a2 as shown in FIG. 13C. In this case, each display portion may be plane, or have at least the convex or concave part. In the case of having such the multiple display portions, viewpoints of multiple users 106 to the multiple display portions may be respectively obtained so that the pixel data corresponding to each pixel-displaying element in the respective display portions may be obtained, thereby allowing actual images each corresponding to any of the viewpoints of the users 106 to be displayed side by side on the display portions 101a, respectively.

Although in FIG. 13C, two display portions 101a1, 101a2 are shown with the same object OB being seen in different directions, but the invention is not limited thereto. According to the invention, they may display images with the same object OB being seen in same direction, or different objects being seen. This depends on what kinds of the image data are stored in the data storage 102 (see FIG. 2) as the image data of multiple screens for the display portions 101a1, 101a2.

If a surface of the display portion 101a of the display 101 has at least the convex or concave part, the data storage 102 previously stores image data of multiple screens, which is obtained by imaging the object OB by the camera 103 arranged for the position DS' on an imaged plane corresponding to each split area DS that is obtained by splitting the display portion 101a to include one or more pixel-displaying element. In this case, the camera 103 is also arranged so that its focus point can stay in the position DS' on the imaged plane and an axis of its lens can be orthogonal to the imaged plane. The camera 103 then images the object OB.

If a surface of the display portion 101a of the display 101 has at least the convex or concave part, the image-data-generating unit 231 as shown in FIG. 8 sets each of the multiple pixel-displaying elements arranged on the display portion 101a as a subject pixel-displaying element Q in turn and obtains pixel data corresponding to this subject pixel-displaying element Q in turn. Namely, similar to FIGS. 3B and 9, as the pixel data corresponding to this subject pixel-displaying element Q, set pixel data is obtained from multiple items of pixel data constituting image data of one screen, which is obtained by imaging the object by the camera 103 arranged for a position DS' on an imaged plane 101a' corresponding to each split area DS including the subject pixel-displaying element Q. The set pixel data corresponds to a beam of light irradiated from the object OB along a straight line connecting the viewpoint P and each of the subject pixel-displaying elements Q.

In this case, the image-data-generating unit 231 also specifies pixel positions in the imaging part of the camera 103 for obtain the set pixel data. Thus, similar to FIG. 3C, the virtual screen VSCN that is orthogonal to the axis of lens of the camera 103 is set between the display portion 101a and the object OB. It is conceivable in this case that an image imaged by the imaging part of the camera 103 may be mapped on the virtual screen VSCN.

Figure 14:
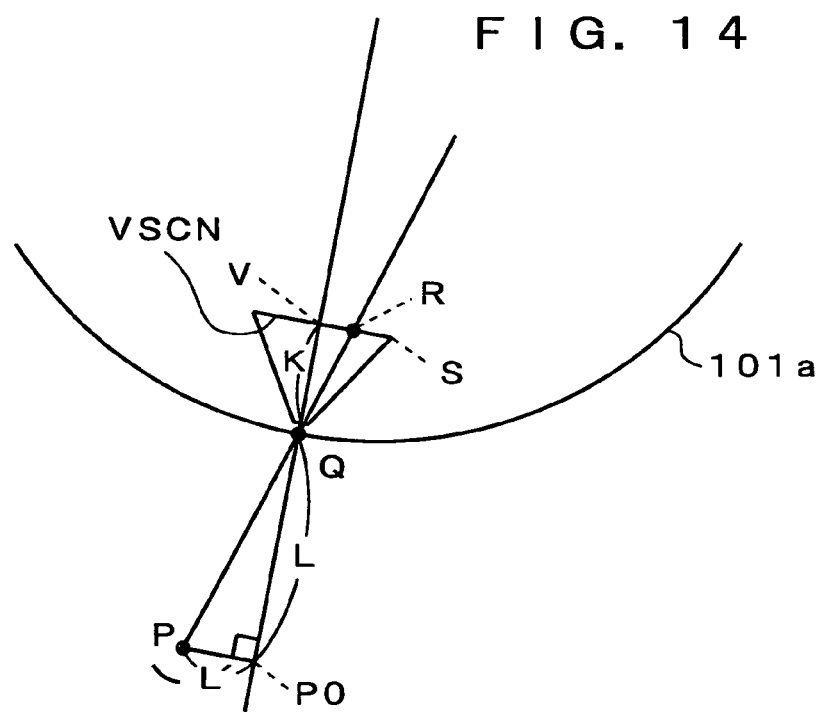
FIG. 14 is a diagram for illustrating how to obtain a coordinate of a reference point in (a spherical display)

As shown in FIGS. 3C and 14, an intersection between the straight line connecting the viewpoint P and the subject pixel-displaying element Q and the virtual screen VSCN is estimated as a reference point R. A second dimensional coordinate (xR, yR) of the reference point R is given. In this case, a second dimensional coordinate of the intersection between the axis of lens of the camera 103 and the virtual screen VSCN is estimated as (0, 0). Its X-coordinate xR and Y-coordinate yR are respectively divided by a width W and a height H of the virtual screen VSCN. Thereafter, the divided coordinates multiplied by numbers of horizontal pixels WRL and numbers of vertical pixels HRL of the imaging part of the camera 103 equal the pixel position (xR', yR') of imaging part of the camera 103 for obtaining the set pixel data.

The following will be described on how to get the pixel position (xR', yR') with reference to FIG. 14. A horizontal end point of the virtual screen VSCN is set to S.

The X-coordinate xR of the reference point R is given as |VR-| (the magnitude of vector VR). It is assumed that vector QV is the axis of lens of the camera 103 and one of the horizontal vectors, each of which is orthogonal to the vector QV, is a vector VS. L=|QP0| is given as a scalar product of unit vector QV/|QV| that is parallel to the axis of lens of the camera 103 and the vector PQ, according to the following formula (4):

$$L = \frac{QV}{|QV|} \cdot PQ \quad (4)$$

Similarly, L'=|PP0| is given as a scalar product of the vector PQ and unit vector VS/|VS| that is orthogonal to the axis of lens of the camera 103, according to the following formula (5):

$$L' = PQ \cdot \frac{VS}{|VS|} \quad (5)$$

Thus, the X-coordinate xR of the reference point R is given according to the following formula (6):

$$x_R = |VR| = \frac{K}{L}L' = K\frac{PQ \cdot \frac{VS}{|VS|}}{\frac{QV}{|QV|} \cdot PQ} \quad (6)$$

wherein K is a constant, which indicates a distance between a focus point of the camera 103 and the virtual screen VSCN.

In the formula (6), unit vectors QV/|QV| and VS/|VS| are fixed values that are determined on the basis of the imaged position DS' of the camera 103. They may be previously calculated to each of the imaged positions DS' of the camera 103.

Similarly, the Y-coordinate yR of the reference point R is also given according to the same view as the above X-coordinate xR of the reference point R is given. Therefore, the Y-coordinate yR of the reference point R is also given according to the following formula (7):

$$y_R = K\frac{PQ \cdot \frac{VS'}{|VS'|}}{\frac{QV}{|QV|} \cdot PQ} \quad (7)$$

In the formula (7), VS'/|VS'| indicates vertical unit vector that is orthogonal to the axis of lens of the camera 103. The unit vector VS'/|VS'| is also fixed value that is determined on the basis of the imaged position DS' of the camera 103, as the unit vectors QV/|QV| and VS/|VS|. It may be previously calculated to each of the imaged positions DS' of the camera 103.

Thus, the unit vectors QV/|QV|, VS/|VS|, and VS'/|VS'| are previously calculated to each of the imaged positions DS' of the camera 103. The data storage 102 stores them with corresponding to image data of one screen obtained by imaging the object OB by the camera 103 on each of the imaged positions DS'. Using them when calculating X-coordinate xR and Y-coordinate yR of the reference point R according to the formulae (6) and (7) allows the calculation thereof to be accelerated.

Thus, it is possible to easily and quickly specify pixel position in the imaging part of the camera 103 that obtains the set pixel data corresponding to the subject pixel-displaying element Q of the display portion 101a. It is also possible to obtain the pixel data, which corresponds to the viewpoint P, for displaying pixel on each pixel-displaying element of the display portion 101a, briefly. This enables an image corresponding to an alteration of the viewpoint P to be smoothly displayed on the display portion 101a.

Figure 15:
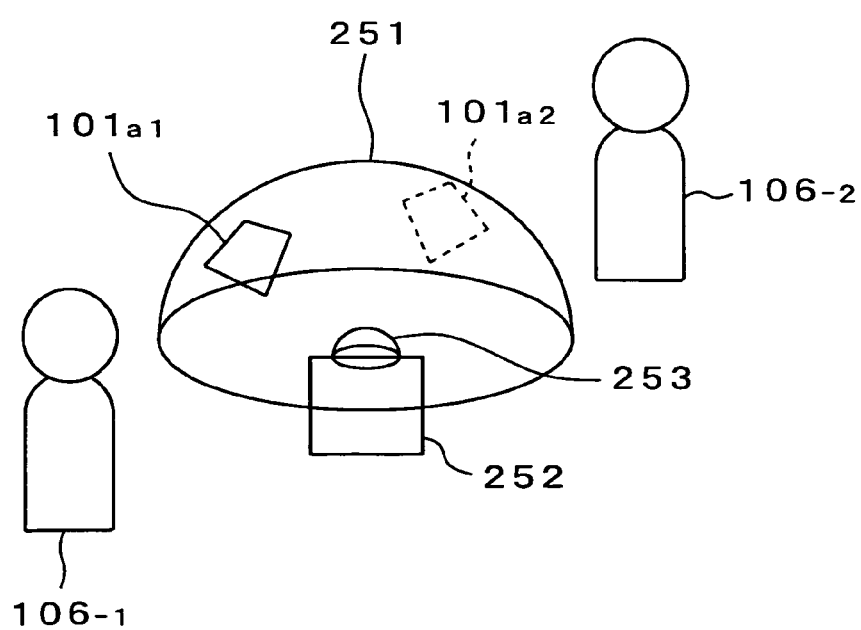
FIG. 15 is a diagram for illustrating a configuration of another embodiment of the image-displaying apparatus according to the invention.

FIG. 15 shows an image-displaying apparatus 100A wherein an image generated by a image-generating unit 252 is projected to a semi-spherical screen 251 having multiple display portions, for example, two display portions $101a_1$ and $101a_2$, via fish-eye lens 253.

In the image-displaying apparatus 100A, the display portions $101a_1$ displays an image corresponding to the viewpoint of the user 106-1 and the display portions $101a_2$ displays an image corresponding to the viewpoint of the user 106-2.

In this case, it is also conceivable that multiple pixel-displaying elements are arranged in each of the display portions $101a_1$ and $101a_2$. Setting the multiple pixel-displaying elements as the subject pixel-displaying elements Q in turn, calculating X-coordinate xR and Y-coordinate yR of the reference point R according to the formulae (6) and (7) and the like allows the pixel data corresponding to each of the multiple pixel-displaying elements to be obtained.

The pixel data corresponding to the multiple pixel-displaying elements is obtained using image data of multiple screens obtained by imaging the object by the camera arranged on a position on the imaged plane corresponding to each split area obtained by splitting each of the display portions 101a1 and 101a2 to include one or more pixel-displaying element.

Figure 16A:
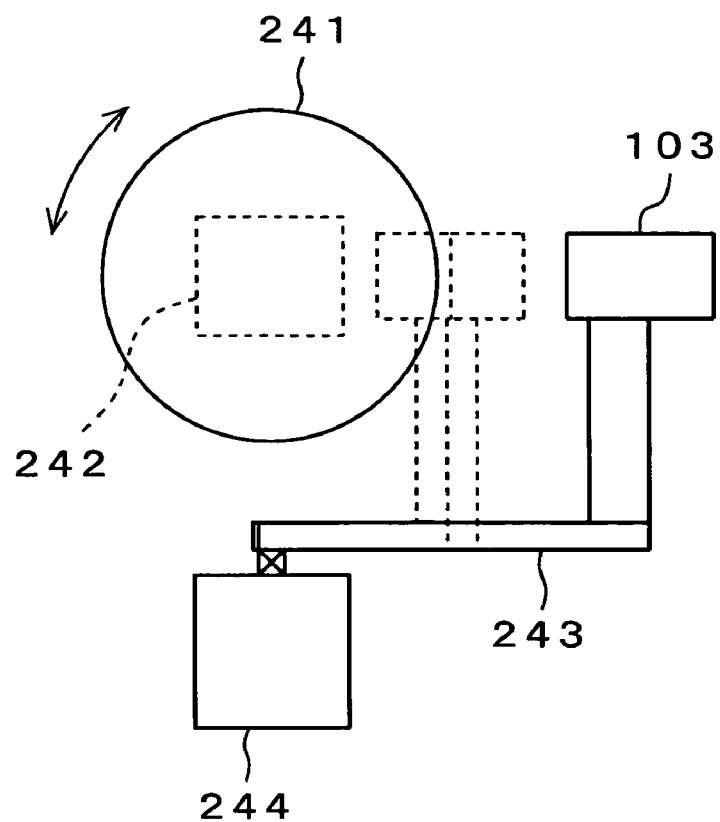
FIGS. 16A and 16B are outlined drawings each for showing, when semi-spherical screen includes a display portion, a configuration of alterations for positions of object and camera, to be altered in a imaged position of camera in order to obtain image data of multiple screens.
Figure 16B:
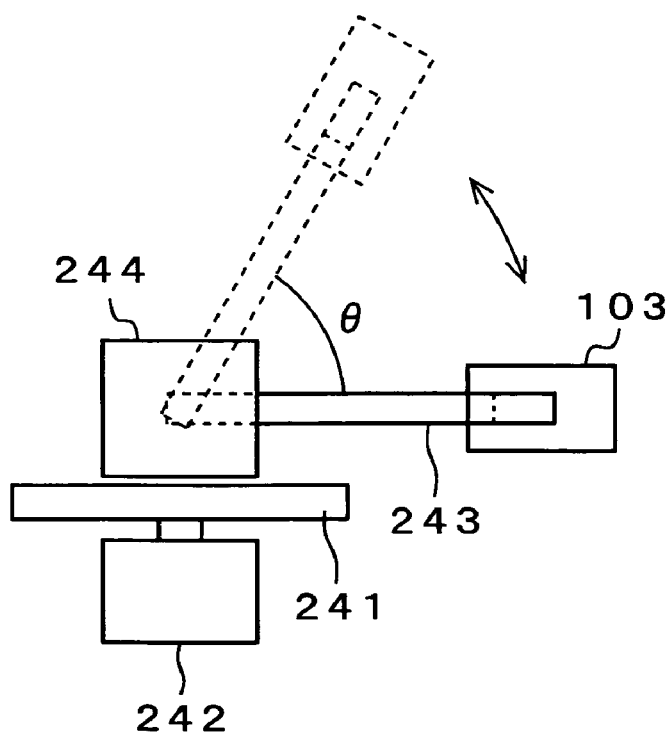

FIGS. 16A and 16B each shows a configuration of the object-position-moving unit 202 and the camera-position-moving unit 203 (see FIG. 4) when obtaining image data of multiple screens. FIG. 16A is a plane view thereof and FIG. 16B is a side view thereof.

A motor 242 rotates a table 241 mounting an object OB, which is not shown in FIGS. 16A and 16B. L shaped arm 243 has an end attaching the camera 103 and the other end fixing the rotary shaft of motor 244. The motor 244 rotates the arm 243 so that it can be lifted within a range of angle θ from 0 to 90 degrees. Controlling both of rotation angle of the table 241 and the angle θ of the arm 243 at the same time allows the camera 103 to direct from optional latitude and longitude to a center of the table 241 and to image the object OB.

In the image-displaying apparatus 100A shown in FIG. 15, the image(s) generated by the image-generating unit 252 is (are) projected from a rear side of the screen 251 to the display portions 101a1, 101a2 thereof, respectively, via the fish-eye lens 253. Therefore, it is necessary for the image-generating unit 252 to generate the image(s) to be projected so that on each pixel-displaying element of the display portions $101a_1$, $101a_2$, pixel by the pixel data corresponding thereto can be displayed.

For example, if using a fish-eye lens known as "equidistance projection (fθ)" when coordinate of the semi-spherical screen 251 is expressed as a (north) latitude φ and a longitude θ with comparing its semi-sphere with the Northern Hemisphere, to display pixel on the subject pixel-displaying element of the coordinate (φ, θ) in each of the display portions $101a_1$ and $101a_2$, the pixel by the pixel data corresponding to the subject pixel-displaying element may be merely displayed on a position of the coordinate (kφ cos θ, kφ sin θ) in the image to be projected by the image-generating unit 252. Herein a term, "k" is a constant, the following ditto.

For example, if using a fish-eye lens known as "sterographic projection (2f tan(θ/2))" when coordinate of the semi-spherical screen 251 is expressed as a (north) latitude φ and a longitude θ with comparing its semi-sphere with the Northern Hemisphere, to display pixel on the subject pixel-displaying element of the coordinate (φ, θ) in each of the display portions $101a_1$ and $101a_2$, the pixel by the pixel data corresponding to the subject pixel-displaying element may be merely displayed on a position of the coordinate (2k tan(θ/2)cos θ, 2k tan(φ/2)sin θ) in the image to be projected by the image-generating unit 252.

For example, if using a fish-eye lens known as "equisoid angle projection (2f sin(θ/2))" when coordinate of the semi-spherical screen 251 is expressed as a (north) latitude φ and a longitude θ with comparing its semi-sphere with the Northern Hemisphere, to display pixel on the subject pixel-displaying element of the coordinate (φ, θ) in each of the display portions $101a_1$ and $101a_2$, the pixel by the pixel data corresponding to the subject pixel-displaying element may be merely displayed on a position of the coordinate (2k sin(φ/2)cos θ, 2k sin(φ/2)sin θ) in the image to be projected by the image-generating unit 252.

In the image-displaying apparatus 100 shown in FIG. 2, the viewpoint of the user 106 is obtained using the positional sensor 107 so that the image corresponding to the viewpoint thus obtained can be displayed on the display portion 101a of the display 101. Alternatively, instead of obtaining the viewpoint of the user 106, an optional viewpoint of viewer may be set so that an image corresponding to the viewpoint thus set can be displayed on the display portion 101a of the display 101. In this case, by setting the optional viewpoint with it being moved, the user 106 can see the image as if the viewpoint is moved, although he or she is not actually moved. For example, if the display portion 101a has a projected spherical surface when setting the optional viewpoint with it being rotated around a center of the sphere with a offset point, the user 106 can see the rotated image, although he or she stays still actually.

This invention is applied to a case where in a conventional well-known third dimensional display system using a naked-eye-visible third dimensional display such as lenticular lens, liquid crystal shutter glass, and the like, an image to be viewed from left eye of the viewer and the image to be viewed from right eye of the viewer aregenerated. To display the image (left-eye-image) to be viewed from left eye of the viewer, the pixel data corresponding to each pixel-displaying element of a first display portion for displaying the left-eye-image is obtained with the position of left eye being set as a viewpoint. To display the image (right-eye-image) to be viewed from right eye of the viewer, the pixel data corresponding to each pixel-displaying element of a second display portion for displaying the right-eye-image is obtained with the position of right eye being set as a viewpoint. In this case, the user see the left-eye-image displayed on the first display portion by his or her left eye and the right-eye-image displayed on the second display portion by his or her right eye. This allows third dimensional image corresponding to the viewpoints to be viewed.

According to the embodiment, image data of multiple screens obtained by imaging an object by the imaging device are prepared wherein the imaging device is arranged with its focus point being positioned at a position on an imaged plane corresponding to each split area obtained by splitting the display portion of the image display to include at least one pixel-displaying element, and an axis of its lens being orthogonal to the imaged plane, and the set pixel data that corresponds to a beam of light irradiated from the object along a straight line connecting the viewpoint and the subject pixel-displaying element is obtained from multiple items of pixel data constituting image data of one screen, which are obtained by the imaging device arranged for a position on an imaged plane corresponding to each split area including the subject pixel-displaying element, as pixel data for displaying pixel on the subject pixel-displaying element. This allows actual image corresponding to the optional viewpoint to be well displayed on the display portion having its surface of a predetermined shape.

Thus, according to the invention, the actual image corresponding to the optional viewpoint may be well displayed on the display portion having its surface of a predetermined shape. For example, this invention may be applied to an image-displaying apparatus wherein an image properly presenting moving impression based on the alteration of head position of the viewer (the user) may be viewed.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An image-displaying apparatus comprising:
   image display including a display portion having its surface of a predetermined shape, said display portion being provided with a plurality of pixel-displaying elements;
   storage device for storing image data of multiple screens obtained by imaging an object by imaging device, wherein said imaging device is arranged with its focus point being positioned at a position on an imaged plane corresponding to each split area obtained by splitting said display portion of said image display to include at least one pixel-displaying element, and an axis of its lens being orthogonal to said imaged plane;
   position-acquiring device for acquiring a viewpoint of viewer to said display portion of said image display; and
   image-processing device for processing the image data to set each pixel-displaying element arranged on the display portion of said image display as a subject pixel-displaying element in turn and to obtain set pixel data from multiple items of pixel data constituting image data of one screen as pixel data for displaying pixel on said subject pixel-displaying element, said image data being obtained by said imaging device arranged for a position on the imaged plane corresponding to said split area including said subject pixel-displaying element and stored in said storage device, said set pixel data corresponding to a beam of light from the object, said beam of light being irradiated along a straight line connecting said viewpoint of the viewer acquired by said position-acquiring device and said subject pixel-displaying element.

2. The image-displaying apparatus according to claim 1, wherein said image display has multiple display portions; wherein said position-acquiring device acquires each of the viewpoints of the viewers to each of the multiple display portions; and wherein said image-processing device obtains the pixel data relative to each of said multiple display portions based on each of said viewpoints of the viewers to each of the multiple display portions, said viewpoints of the viewers being respectively obtained by said position-acquiring device.

3. The image-displaying apparatus according to claim 1, wherein the surface of said display portion of said image display is plane.

4. The image-displaying apparatus according to claim 1, wherein the surface of said display portion of said image display has at least its non-flat part.

5. The image-displaying apparatus according to claim 4, wherein said storage device stores unit vector of said imaging device along the axis direction of its lens and unit vectors of said imaging device along vertical and horizontal directions thereof, said vertical and horizontal directions being orthogonal to said axis direction of lens, said vectors respectively corresponding to said image data of one screen; and wherein said image-processing device specifies pixel position in an imaging part of said imaging device, said imaging part obtaining said set pixel data, using said unit vectors stored in said storage device when obtaining said set pixel data.

6. The image-displaying apparatus according to claim 1, wherein said image display includes:

semi-spherical screen having said display portion;

projector for projecting the image to said display portion of the semi-spherical screen via fish-eye lens; and image generator for generating the image to be projected by said projector, based on the pixel data corresponding to each of the pixel-displaying elements arranged on said display portion, said pixel data being obtained by said pixel-processing device.

7. The image-displaying apparatus according to claim 1, wherein said display portion includes a first display sub-portion for displaying an image to be viewed from left eye of the viewer and a second display sub-portion for displaying the image to be viewed from right eye of the viewer;

wherein said position-acquiring device acquires a viewpoint of the viewer's left-eye to the first display sub-portion of said display portion and a viewpoint of the viewer's right-eye to the second display sub-portion of said display portion; and wherein said image-processing device obtains the pixel data relative to said first display sub-portion based on said viewpoint of the viewer's left-eye acquired by said position-acquiring device, and the pixel data relative to said second display sub-portion based on said viewpoint of the viewer's right-eye acquired by said position-acquiring device.

8. An image-displaying apparatus comprising:

image display including a display portion having its surface of a predetermined shape, said display portion being provided with a plurality of pixel-displaying elements;

storage device for storing image data of multiple screens obtained by imaging an object by imaging device, wherein said imaging device is arranged with its focus point being positioned at a position on an imaged plane corresponding to each split area obtained by splitting said display portion of said image display to include at least one pixel-displaying element, and an axis of its lens being orthogonal to said imaged plane;

position-setting device for setting a viewpoint of viewer to said display portion of said image display; and image-processing device for processing the image data to set each pixel-displaying element arranged on the display portion of said image display as a subject pixel-displaying element in turn and to obtain set pixel data from multiple items of pixel data constituting image data of one screen as pixel data for displaying pixel on said subject pixel-displaying element, said image data being obtained by said imaging device arranged for a position on the imaged plane corresponding to said split area including said subject pixel-displaying element and stored in said storage device, said set pixel data corresponding to a beam of light from the object, said beam of light being irradiated along a straight line connecting said viewpoint of the viewer set by said position-setting device and said subject pixel-displaying element.

9. The image-displaying apparatus according to claim 8, wherein said image display has multiple display portions; wherein said position-setting device sets each of the viewpoints of the viewers to each of the multiple display portions; and wherein said image-processing device obtains the pixel data relative to each of said multiple display portions based on each of said viewpoints of the viewers to each of the multiple display portions, said viewpoints of the viewers being respectively set by said position-setting device.

10. A method for obtaining pixel data of image display including a display portion having its surface of a predetermined shape, said display portion being provided with a plurality of pixel-displaying elements, said pixel data allowing pixel to be displayed on said plurality of pixel-displaying elements, said method comprising the steps of;

preparing image data of multiple screens obtained by imaging an object by imaging device, wherein said imaging device is arranged with its focus point being positioned at a position on an imaged plane corresponding to each split area obtained by splitting said display portion of said image display to include at least one pixel-displaying element, and an axis of its lens being orthogonal to said imaged plane, and determining a viewpoint of viewer to said display portion of said image display; and setting each pixel-displaying element arranged on the display portion of said image display as a subject pixel-displaying element in turn, and obtaining set pixel data from multiple items of pixel data constituting image data of one screen as pixel data for displaying pixel on said subject pixel-displaying element, said image data being obtained by said imaging device arranged for a position on an imaged plane corresponding to the split area including said subject pixel-displaying element, said set pixel data corresponding to a beam of light from the object, said beam of light being irradiated along a straight line connecting said determined viewpoint and said subject pixel-displaying element.

11. A computer readable medium for storing a computer program for obtaining pixel data of image display including a display portion having its surface of a predetermined shape, said display portion being provided with a plurality of pixel-displaying elements, said pixel data allowing pixel to be displayed on said plurality of pixel-displaying elements, said program comprising the steps of;

preparing image data of multiple screens obtained by imaging an object by imaging device, wherein said imaging device is arranged with its focus point being positioned at a position on an imaged plane corresponding to each split area obtained by splitting said display portion of said image display to include at least one pixel-displaying element, and an axis of its lens being orthogonal to said imaged plane, and determining a viewpoint of viewer to said display portion of said image display; and setting each pixel-displaying element arranged on the display portion of said image display as a subject pixel-displaying element in turn, and obtaining set pixel data from multiple items of pixel data constituting image data of one screen as pixel data for displaying pixel on said subject pixel-displaying element, said image data being obtained by said imaging device arranged for a position on an imaged plane corresponding to the split area including said subject pixel-displaying element, said set pixel data corresponding to a beam of light from the object, said beam of light being irradiated along a straight line connecting said determined viewpoint and said subject pixel-displaying element.

* * * * *